(12) United States Patent
Krahnert et al.

(10) Patent No.: US 9,701,094 B2
(45) Date of Patent: Jul. 11, 2017

(54) LAYERED SEMI-FINISHED PRODUCT AND METHOD FOR PRODUCING IT

(71) Applicants: Technische Universität Dresden, Dresden (DE); Thyssenkrupp Steel Europe AG, Duisburg (DE); Leichtbau-Zentrum Sachsen GmbH, Dresden (DE)

(72) Inventors: Torsten Krahnert, Seddin (DE); Lothar Patberg, Moers (DE); Stefan Mayer, Schwerte (DE); Marcus Knobloch, Dresden (DE); Jens Werner, Coswig (DE); Werner Hufenbach, Dresden (DE); Martin Lepper, Dresden (DE)

(73) Assignees: Technische Universität Dresden, Dresden (DE); Thyssenkrupp Steel Europe AG, Duisburg (DE); Leichtbau-Zentrum Sachsen GmbH, Dresden (DE)

( * ) Notice: Subject to any disclaimer, the term of this patent is extended or adjusted under 35 U.S.C. 154(b) by 121 days.

(21) Appl. No.: 14/408,966

(22) PCT Filed: Jun. 17, 2013

(86) PCT No.: PCT/EP2013/062519
§ 371 (c)(1),
(2) Date: Dec. 18, 2014

(87) PCT Pub. No.: WO2013/189886
PCT Pub. Date: Dec. 27, 2013

(65) Prior Publication Data
US 2015/0321450 A1 Nov. 12, 2015

(30) Foreign Application Priority Data
Jun. 18, 2012 (EP) .................................... 12172451

(51) Int. Cl.
*B32B 5/22* (2006.01)
*B32B 37/18* (2006.01)
(Continued)

(52) U.S. Cl.
CPC ................ *B32B 5/22* (2013.01); *B29C 53/24* (2013.01); *B29C 70/44* (2013.01); *B29C 70/542* (2013.01);
(Continued)

(58) Field of Classification Search
CPC ................................ B29C 53/00; B29C 53/18
(Continued)

(56) References Cited

U.S. PATENT DOCUMENTS

2008/0261046 A1* 10/2008 Husler .................. B29C 70/44
428/411.1

FOREIGN PATENT DOCUMENTS

DE  102010031886 A1  1/2012
FR  2711682 A1  5/1995
(Continued)

*Primary Examiner* — Brent O'Hern
(74) *Attorney, Agent, or Firm* — Michael Soderman (57) ABSTRACT

The object of the present invention is a layered semi-finished product having a layer sequence containing at least one layer of an unconsolidated fabric of reinforcing fibers. At reduced pressure, this layer sequence is arranged between a top and a bottom film connected to each other along their periphery in a pressure-retaining manner. In advantageous modifications of the layered semi-finished product according to the invention, the preforming of the semi-finished, as well as the inclusion of metallic inserts or other components into said semi-finished is intended. Furthermore, a method for producing the layered semi-finished product according to the invention is described.

12 Claims, 3 Drawing Sheets

(51) Int. Cl.
  *B29C 53/24* (2006.01)
  *B32B 38/00* (2006.01)
  *B32B 37/10* (2006.01)
  *B32B 27/12* (2006.01)
  *B32B 3/28* (2006.01)
  *B32B 3/04* (2006.01)
  *B29C 70/44* (2006.01)
  *B29C 70/54* (2006.01)
  *B29C 70/86* (2006.01)
  B29K 101/12 (2006.01)
  B29K 105/20 (2006.01)
  B29K 705/00 (2006.01)
  B29K 105/00 (2006.01)
  B29L 9/00 (2006.01)
  B29L 31/00 (2006.01)

(52) U.S. Cl.
  CPC ............. *B29C 70/865* (2013.01); *B32B 3/04* (2013.01); *B32B 3/28* (2013.01); *B32B 27/12* (2013.01); *B32B 37/1018* (2013.01); *B32B 37/185* (2013.01); *B32B 38/0004* (2013.01); *B29K 2101/12* (2013.01); *B29K 2105/20* (2013.01); *B29K 2105/256* (2013.01); *B29K 2705/00* (2013.01); *B29L 2009/003* (2013.01); *B29L 2031/772* (2013.01); *B32B 2305/076* (2013.01); *B32B 2305/18* (2013.01); *B32B 2305/34* (2013.01); *B32B 2309/68* (2013.01); *B32B 2311/00* (2013.01); *B32B 2398/20* (2013.01); *B32B 2605/00* (2013.01); *B32B 2605/18* (2013.01); *Y10T 156/1052* (2015.01); *Y10T 428/239* (2015.01)

(58) Field of Classification Search
  USPC ........................................................ 156/250
  See application file for complete search history.

(56) References Cited

FOREIGN PATENT DOCUMENTS

| | | | |
|---|---|---|---|
| JP | 53016785 A | 2/1978 | |
| JP | S53-012964 | 2/1978 | |
| JP | S60-500284 A2 | 3/1985 | |
| JP | 61261012 A | 11/1986 | |
| JP | S61-1261012 A | 11/1986 | |
| JP | H07-132514 A | 5/1995 | |
| JP | 2002-248620 A | 9/2002 | |
| JP | 2013-535356 A | 9/2013 | |
| SE | WO 8402490 A1 * | 7/1984 | ......... B29C 37/0064 |
| WO | 84/02490 A1 | 7/1984 | |
| WO | 8401490 A1 | 7/1984 | |
| WO | 2012007160 A2 | 1/2012 | |

* cited by examiner

LAYERED SEMI-FINISHED PRODUCT AND METHOD FOR PRODUCING IT

CROSS-REFERENCE TO RELATED APPLICATIONS

This application is the U.S. national stage of International Application No. PCT/EP2013/062519 filed on Jun. 17, 2013, and claims the benefit thereof. The international application claims the benefit under 35 USC 119 of European Application No. EP 12172451.2 filed on Jun. 18, 2012; all applications are incorporated by reference herein in their entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Field of the Invention

The invention relates to a layered semi-finished product, for further processing into fibre-reinforced composite components, and to a method for producing the semi-finished product.

Description of Related Art Including Information Disclosed Under 37 CFR 1.97 and 1.98

Fibre-reinforced composite materials, consisting of technical textiles and thermoplastic plastic materials, are known from prior art. Also known are flat semi-finishes, such as prepregs and semipregs, which consist of textile and thermoplastics layers interconnected to one another, but not yet fully mutually consolidated, or organic sheets. Producing such semi-finishes usually takes place in continuous processes, for instance in double belt presses, utilizing pressure and temperature, involving at least partially fusing the thermoplastic and connecting it to the textile. This pre-consolidation results in restrictions regarding the use of varying thermoplastics, layer thicknesses, or fibre layers and fibre orientations, since adhesion among the individual layers might be influenced by this pre-consolidation.

Semi-finishes of this kind usually serve the users for producing complex structures, for example in the areas of vehicle construction or aerospace technology. In order to produce one finished component made of fibre-reinforced composite material, usually several of these semi-finishes are stacked one on another in or on a mould. Due to the existing firm bond between thermoplastic and textile layers on account of a glue or a partial consolidation, at this stage the cold formability of the semi-finish is greatly restricted. This requires heating up the semi-finish to the thermoplastics' melting temperature already during preforming, that is, even before the actual forming step, in which the semi-finishes are consolidated and hardened in themselves and with each other by means of increasing their temperature.

The terms "to consolidate" and "consolidation" mean in this context that the fibre-reinforced composite material is hardened (cured). This may happen in part (partial consolidation) or completely. The fibre-reinforced composite material is said to be unconsolidated when no hardening process has occurred.

These two heating processes, which result from the structure of current semipregs and prepregs are not only energetically unfavourable, but also result in trapping more air between the individual layers as the semi-finishes are joined together. This may have a negative effect on both mechanical properties and aesthetics of the finished component.

To avoid such air pockets, the semi-finishes are often joined together at reduced pressure.

In this context, publication WO2001/000405 A2 describes a method wherein a partly consolidated prepreg is evacuated in and heated a vacuum bag to remove air trapped between the prepreg layers. The heating, taking place simultaneously with air removal, ensures a complete saturation of the fibrous material with the thermoplastic, and finally a consolidation of the layers resulting in the finished component. Also in this case, the pre-consolidation of the prepreg results in poor cold formability, which makes premelting during preforming necessary. In addition, the entire technical equipment and other expenses for evacuating air is still to be provided by the end user.

Enclosing the semi-finishes, and possibly also the mould, in a vacuum bag, in any case means increased labour and increased technical effort for the user. In order to make air evacuation of the layer structure as simple as possible for the end user, some semi-finishes are already known from prior art that have an optimised structure for evacuating air in a vacuum bag.

In this context publication EP 2 085 212 A1 describes a multi-layered, fibre-reinforced flat thermoplastic material, the core of which contains layers having venting openings or ducts, so that the trapped air may escape better during compression and consolidation of the flat material. However, the individual layers of the multi-layered flat material are in this case firmly joined to each other; for instance, the cover layers are pressed on after heating them, thus glueing them to the remaining flat material. The ensuing pre-consolidation results in a poor cold formability of the flat material. Furthermore, the evacuation of air from the layers, together with, or shortly before the forming step, still involves complex technical equipment.

To disburden the end user, some methods are already known from prior art in which producing the semi-finishes takes place under vacuum, thus evacuating them already during production.

Publication DE 41 15 831 A1 describes a continuous method for producing flat composite materials, whereby a layered flat material is processed into a tubular film. The individual layers made from thermoplastics and a fabric of reinforcing fibre are contained in a string of continuous tubing the edges of which are firmly joined together, in parallel to the feed direction. Evacuation of the continuous tubing, respectively of the layered flat material then takes place when the stacked layers are passing through a press. In this press the tubular film is sealed at a right angle to the feed direction, and the matrix thermoplastic is heated and melted. Evacuation of the flat material thus takes place at the same time as its consolidation or pre-consolidation. In the first case, the complex evacuation of the prepreg is a matter for the user; in the second case, the result is yet again a pre-consolidated semi-finished of poor cold formability.

In addition, known semi-finishes are not suitable, or only in a very limited manner, for producing components with complex geometries. Sometimes the problem arises that the semi-finishes, when placed in a press, or upon closing the press in order to consolidate them, shift, or do not fit evenly due to their complex geometry.

None of the semi-finishes known so far from prior art combines all those properties necessary for producing complex components with an excellent spectrum of characteristics. These characteristics include in particular: good drapability, avoiding fibre slip, and preventing air pockets in the semi-finished product. This applies equally to the prepegs known from prior art, layered structures made from fabrics of reinforcing fibres which have been pre-impregnated using matrix materials, and the already known semipregs, layered structures having superficially joined layers made from fabrics of reinforcing fibres and matrix material.

BRIEF SUMMARY OF THE INVENTION

The invention relates to a layered semi-finished product. A layer sequence having at least one layer of an unconsolidated fabric of reinforcing fibres is arranged, at reduced pressure, between a top film and a bottom film made from thermoplastic matrix material. The films are connected to each other along their periphery in a pressure-retaining manner.

The invention also relates to a method for producing a layered semi-finished product with the steps:
a. the layer sequence between the top and the bottom film made from thermoplastic matrix material is arranged,
b. the protruding edges of the top and bottom film made from thermoplastic matrix material are connected with one another, and
c. the volume between top and bottom film made from thermoplastic matrix material is evacuated,
d. whereby the steps b. and c. are carried out in any desired sequence, simultaneously or overlapping in time.

BRIEF DESCRIPTION OF THE SEVERAL VIEWS OF THE DRAWINGS

FIG. 1a shows the bottom film, the layers of the layer sequence and the top film laid on one another in sequence;

FIG. 1b shows the stack placed in the vacuum chamber;

FIG. 1c shows the stack compressed using the tool;

FIG. 1d shows the completed semi-finished product taken out.

FIG. 2a shows the stack made from the bottom film, the top film and the layer sequence;

FIG. 2b shows how the protrusions of the top film and bottom film are sealed along their whole periphery;

FIG. 2c shows the bending of the semi-finished product such that curvature is created in the metallic inserts;

FIG. 2d shows the bending of the remaining metallic inserts;

FIG. 2e shows the semi-finished product already adjusted to the geometry of the tool for consolidating.

FIG. 3a shows the bottom film, the layers of the layer sequence and the top film placed in the mould in sequence;

FIG. 3b shows the mould with the stack positioned in the vacuum chamber;

FIG. 3c shows the completed semi-finished product taken out.

DETAILED DESCRIPTION OF THE INVENTION

The object of the present invention is to present an economically priced semi-finish, respectively semi-prepeg having the necessary characteristics for producing complex fibre composite components and a method for the production thereof, thus overcoming the aforementioned disadvantages of prior art. The semi-finished product according to the invention is to provide embodiments especially suitable for thick layer structures and for producing components with complex geometries. Furthermore, embodiments of the semi-finished are to respond particularly well to the expected stresses of the finished end product manufactured from the semi-finish. In addition, a method for producing the semi-finishes is to be presented.

This object is achieved by a semi-finish having the characteristics of the main claim, and by a method for producing said semi-finish according to claim 15 or 18. Preferred modifications are described in the corresponding dependent sub-claims.

The semi-finish according to the invention comprises a top and a bottom film, as well as a layer sequence arranged between top film and bottom film. The layer sequence is composed of one or several layers. The layer sequence has at least one layer of a fabric of reinforcing fibres with unconsolidated reinforcing fibres. Apart from this, in a preferred embodiment the layer sequence has at least one layer having at least one flat metallic insert. In a further preferred embodiment, the metallic inserts are integrated into the fabric of reinforcing fibres. In a further preferred embodiment—additionally or alternatively to this arrangement—matrix material is also integrated into the fabric of reinforcing fibres, however this latter is unconsolidated.

Optionally, the layer sequence comprises further layers. These further layers may also be formed by further films, which are not identical with the top or bottom film. These further layers may preferably be layers made of fabrics of reinforcing fibres, or matrix material, whereby layers containing a mixture of fabrics of reinforcing fibres and matrix material (hybrid layers) are also possible.

Optionally, further layers containing metallic inserts are possible.

Advantageously, metallic inserts make it possible to adapt the geometry of the semi-finish to the tool shape before placing it into the consolidating tool. The metallic inserts are in this case arranged in the edge areas, respectively in the areas of small curvature radii of the component geometry to be produced. The semi-finish will thus after adapting the geometry, keep this geometry. If the semi-finished is bent several times for adjusting its geometry, these bends may be directed in the same and/or in different spatial directions. Only due to the previously adjusted geometry, safely inserting the semi-finish into the consolidation tool is made possible, so that the semi-finish according to the invention is particularly well suited for producing components having complex geometries. Adjusting the geometry may be achieved for instance by bending or deep drawing (thermoforming). The semi-finishes according to the invention may therefore be transported and stored in flat shape, requiring less space, and thus advantageously resulting in substantial savings.

The top and bottom films themselves are preferably made from thermoplastic matrix material. If top and bottom films are not made from matrix material, then according to the invention, between these films matrix material is arranged, in addition to the fabric of reinforcing fibres and to at least one optionally present layer having metallic inserts.

The top and bottom films are completely connected to each other along their periphery, whereby in the volume between them a vacuum, or partial vacuum (low pressure) prevails.

By means of the top and bottom films and their connection along their periphery, the volume is sealed in and retains this pressure, so that the low pressure is maintained over the storage period of the semi-finish, or decreases only slightly (i.e. product usability is maintained over the storage period). The fabric of reinforcing fibres of the semi-finished according to the invention is unconsolidated without exception. The semi-finished is preferably flat, or nearly flat. However, it may also have one or several bends or curves. In case the semi-finished has several bends, these may be directed in the same and/or different spatial directions. The same applies to the mould (having one or several bends) for producing the semi-finished, if such is used.

The vacuum, respectively the reduced pressure is preferably in the range between 0.1 mbar and 800 mbar, particularly preferably between 1 mbar and 100 mbar. Evacuating, or evacuation is henceforth taken to mean the creation of such reduced pressure by means of methods from prior art (for example, vacuum pumps).

The material thickness of the top respectively bottom film is preferably 0.05 mm to 1 mm. In any case, the thickness must be sufficiently great to guarantee the maintenance of the vacuum for the intended storage period. The expected manoeuvring and cold forming processes connected with production preparation and fitting to the geometry or tool shape must not lead to film breakage.

The top and bottom films of the semi-finished product according to the invention are completely connected to each other along their periphery. Thus, they completely envelop the layer sequence. If a tubular film is used to form the top and bottom films by inserting the layer sequence into said tubular film, the film part of the tubular film which is arranged on one side of the layer sequence forms the bottom film, while the opposite part on the other side of the layer sequence forms the top film. The connection along the periphery of top and bottom films then marks the joining of the protrusions at both open tube ends.

In a preferred embodiment, the semi-finished is advantageously pre-formed in line with the shape desired for finish, or further preferred, formed flat and even, or nearly so. This has the advantage of allowing easier inserting into the tool for finish. By evacuating the volume between top and bottom film, the layers of the layer sequence are pressed onto each other making their shifting against each other harder. As a result, during storage the semi-finished maintains the shape it got when the volume was evacuated. However, it is still suitable for forming, since the layers of the layer sequence are not joined form-fit or firmly bonded, but merely friction-locking.

The fabric of reinforcing fibres is preferably flat and flexible. The materials used for the fabric of reinforcing fibres are preferably selected from those types of fibrous materials known from prior art which are common for composite fibre materials, for instance natural, glass, aramid or carbon fibres. Likewise, mixtures of various fibres are possible. The reinforcing fibres may take the shape of regular or irregular textile fabrics. They may for instance be woven fabrics, laid webs, commingled yarns, Hybrid-Yarn-Textile-Thermoplastic (HGGT), braidings or nonwovens, or may be felted or fulled. When using hybrid yarns (i.e. yarns containing matrix material alongside the reinforcing fibres) those are preferred in which fibres and matrix material are not pre-consolidated. The fabrics of reinforcing fibres may vary for instance in fibre type, thickness, fibre cross-linking, fibre impregnation or pre-treatment, and in additives to the layer.

The thickness of one layer of fabric of reinforcing fibres is preferably between 0.1 mm and 30 mm before evacuating the semi-finished. It depends especially on the consideration, which kind of fibre, with which density, and which matrix materials are used. The expert will especially consider that the matrix material must saturate the fabric of reinforcing fibres as completely and evenly as possible in the consolidation process.

The choice of the fabric of reinforcing fibres, and its structure will preferably match the expected stresses and loadings of the finished component. Preferably, various kinds of fibrous and thermoplastic material are used within one semi-finished.

Among the preferred thermoplastic matrix materials used are films or sheets, powders, thermoplastic yearns, granules, and long-fibre or short-fibre reinforced thermoplastics. In this context, both the exclusive use of a certain type of thermoplastic matrix material and the use of several different types within one component are preferred.

The choice of the thermoplastic matrix material to be used will match the expected kinds of stresses and loadings of the finished component. Preferably thermoplastic materials with good cold formability and drapability are used. Preferred matrix materials are thermoplastic polymers chosen from acrylonitrile-butadiene-styrene (ABS), polyamide (PA), polylactic acid (PLA), polymethyl methacrylate (PMMA), polycarbonate (PC), polyethylene terephthalate (PET), polyethylene (PE), polypropylene (PP), polystyrene (PS), polyether ether ketone (PEEK), polyvinyl chloride (PVC).

In another preferred embodiment, the top and bottom films themselves consist of thermoplastic matrix material. This makes it possible to consolidate the semi-finished in a residue-free manner into a finished component made of fibre composite material. To this end, the top and bottom films are particularly preferably made from the same thermoplastic matrix material as that used for consolidation of the fabric of reinforcing fibres.

In principle, material and structure of the matrix materials used correspond to the materials for composite fibre materials known from the state of the art.

Between the top and bottom films, a layer sequence is sealed in, which in the simplest case is merely a layer of fabric of reinforcing fibres, but usually comprises a sequence of different or like layers of fabrics of reinforcing fibres, matrix material, a mixture of a fabric of reinforcing fibres and matrix material, and thermoplastic or thermosetting films and optionally, metallic inserts. The further thermoplastic or thermosetting films are not identical with the top and bottom films, and separate, as the case may be, individual layers or layer sequences.

The kind of materials of fabrics of reinforcing fibres, matrix material and optional metallic inserts may vary per layer, or within one layer. Thus, also those semi-finishes according to the invention are preferred which comprise layers consisting of diverse fibrous materials or thermoplastics, or of a plurality of both. For instance, the semi-finished may contain layers which are made from reinforcing fibres in some places, and from matrix material in others. Therefore, a layer made of reinforcing fibres or matrix material, respectively hybrid material may only take up part of the space of the semi-finished. Likewise, the layers may be perforated or have local apertures. It is advantageous that thus the mechanical properties or optical aspects of the finished products may be specifically adjusted.

Furthermore, the semi-finish may have any geometrical shape; it may be round and/or angular, or have apertures.

Optionally, the layer sequence comprises at least one layer having one or several metallic inserts. These metallic inserts are preferably arranged in those places where the component to be constructed from the semi-finished will be bent, or where especially high stresses and loads may be expected. The metallic inserts are preferably flat and angular, and here particularly preferably shaped as strips or squares. However, depending on the desired characteristics of the component to be constructed, the inserts may have any geometrical shape and thickness. The material to be used for the metallic inserts may also be selected for each insert, having due regard for its desired characteristics. Correspondingly the metallic inserts may also have a bent shape when arranged in places where the component to be constructed will be bent. This has the advantageous result that the semi-finished maintains the bend impressed on it during adjustment of its geometry over longer periods of storage, and despite the loads and stresses to be expected in storage and handling operations. The metallic inserts further serve preferably as local stiffening or reinforcing, or to accommodate joining elements and fasteners, such as for example screw joints. Preferably the metallic inserts are joined to each other, so that they can be placed into the layer sequence as a joint layer of inserts, rather than having to be positioned individually. This takes place preferably by means of fastening at least some of the metallic inserts to each other using flexible connectors (filamentary connectors, strips made from matrix material, or reinforcing fibres, or similar). In a further preferred embodiment it is intended that the metallic inserts are glued onto a film (preferably made from matrix material), or laminated in between two such films.

Particularly preferably, the metallic inserts are pre-positioned on one or several layers of the layer sequence and attached, or stitched on. Attaching may preferably take place using filamentary connectors (such as yarn, matrix thread, etc.) or alternatively by glueing in points or over the surface, preferably using matrix material. In a further particularly preferred embodiment it is intended that another layer, preferably a layer of a fabric of reinforcing fibres, has pocket-shaped or tube-shaped recesses or slits, into which the metallic inserts may be inserted, so as to be positioned together with the other layer in the layer sequence.

However, in a further preferred embodiment it is also possible to insert and position the metallic inserts individually and independently of one another into the layer sequence. A hybrid form is also preferred in which merely a part of the inserts is interconnected. The layer of metallic inserts consists in a preferred embodiment in one single metallic insert, which has the same area measurements as the layer sequence.

The metallic inserts are made from a metal, or an alloy which ensures that the inserts maintain the imprinted shape, and do not spring back into their original shape. Particularly preferred are metallic inserts made from steel, aluminium and magnesium. The metallic inserts are in a preferred embodiment perforated, roughened and/or surface-treated.

The dimensions of the metallic inserts depend on the shape of the semi-finishes and the loads and stresses to be expected in the finished product to be produced from the semi-finish. The thickness of the metallic inserts is to be selected in such a manner that the forming of the semi-finish from a nearly flat and even shape into its bent final shape may be achieved without damaging in the forming process—owing to the resistance of the metallic inserts—any further layers within the layer sequence, or the top or bottom film. A preferred embodiment intends steel strips made from general mild steel, case hardening steel, or deep drawing steel with a thickness between 0.05 mm and 1 mm.

The joining between top and bottom film seals the volume between them with the layer sequence sealed almost completely in a gas-tight manner, that is pressure-retaining. In thermoplastic films joining of the films or sheets takes preferably place by means of a sheet sealing process according to the state of the art. However, methods involving glueing are also suitable. Further preferred methods are flanging or turning over, which are advantageously combined with clamping methods, for example using clamping rails.

According to the invention, the volume, which is sealed in an almost completely gas-tight manner, is evacuated. The layer sequence is therefore almost completely or partially de-aerated. Preferably there are no gas enclosures or sealed sub-cavities within the volume sealed in an almost completely gas-tight manner. Evacuation takes place by means of a method known from prior art, particularly preferably by means of an evacuation cover for air extraction.

Thus, advantageously, the use of glues, binders, or a pre-consolidation of matrix material and fabric of reinforcing fibres to join the individual layers may be dispensed with completely. Therefore, the semi-finished according to the invention has a dry layer structure which allows a relative movement between its individual layers.

In a preferred embodiment two or more layers of the layer sequence are tacked together using thread or yarn. This has the advantage of largely avoiding shifting of the layers relative to one another, whereas prior to evacuation, the layer sequence is draped between top and bottom films, or in the moulding tool.

In a preferred embodiment for the top and bottom layers such materials are selected which have specific characteristics that are preferred for the surface of the finished component. This may include both special thermoplastic materials, for example, having a high scratch resistance and other materials, for example sheets or films of high melt strength. Use of sheets or films of high melt strength is likewise preferred, and leads to a restriction of the reaction space during consolidation, which may preferably be carried out without any additional mould.

The volume present between the films that has been evacuated, maintains its low pressure even over long periods, so that even after long storage trapped air is avoided during component production. This causes a high storage stability of the semi-finished. The semi-finished according to the invention therefore represents a semi-finished advantageously variable regarding layer sequence, layer thickness and dimensions, both suitable for storage and for producing air-pocket-free components with excellent optical and mechanical characteristics.

It is henceforth feasible to produce flat or pre-formed semi-finishes with characteristics adapted to the expected loads and stresses having the advantage of requiring less effort and/or equipment during insertion into the mould and consolidation. In the semi-finished according to the invention, the desired characteristics of the component are already inherent before consolidation.

Functional elements of the component may be also advantageously integrated, even before consolidation, by a corresponding design of the semi-finished. To this end, the following items may preferably be fitted in between top and bottom film: additional electronic components for conducting paths and/or online-diagnostic systems, near-net-shape semi-finished products (foams), metallic sheets, connection options to other components, and/or consolidated thermosetting fabrics of reinforcing fibres.

Insofar as such additionally introduced elements project over the area covered by the top and/or bottom film(s), said elements are integrated in such a manner into the connection of top and bottom film that the volume included between the films remains enclosed almost completely gas-tight. This is for example required for contacting conducting paths or for joining together two components. In this case the sheets are preferably sealed or glued in a gas-tight manner to the projecting elements.

A further object of the invention is a method for producing the layered semi-finished product.

A. Method for Producing a Flat Layered Semi-Finished Product which May have Metallic Inserts The following three partial steps are to be carried out:
Building a flat and even stack from the flat and even layer sequence between top and bottom film,
Evacuating the volume present between top and bottom film
almost completely gas-tight sealing in of the volume between top and bottom film.

Methods for inserting and adjusting the layer sequence between top and bottom film into the mould:
a) In a first preferred method, a thermoplastic bottom film is laid out. Afterwards, the single or pre-connected layers of the layered structure or the complete prepared layered structure are laid out onto the bottom film. In a preferred embodiment the layers have one or several metallic inserts. Then the thermoplastic top film is draped over the layer sequence. If pre-connected layers are used, these are preferably tacked together with thread or yarn (which may also contain matrix material), so that they may still shift a little against one another, but cannot completely be detached from one another or shift too much either.
b) In a second preferred method, it is intended that the layer structure, which may contain metallic inserts, is arranged in such a manner between two thermoplastic films that said films cover the layer structure as top and bottom film, protruding laterally on all sides. Subsequently the top and bottom films are partially connected with each other. However, one or several point (s) of access to the sealed-in volume are retained. In a preferred modification of this method, it is intended that the remaining point(s) of access are provided with connecting parts to connect the pumping device for evacuating the volume between top and bottom film. For this purpose, preferably a connecting part (for example a tube) is inserted between top and bottom film, which films are then connected with each other up to the connecting part, and there connected to the latter. Thus, the connecting part forms the point of access for evacuation.
c) In a third preferred method, it is intended that the layer structure, which may contain metallic inserts, is arranged in such a manner between two thermoplastic films that said films cover the layer structure as top and bottom films, protruding laterally on all sides. Subsequently the top and bottom films are completely connected along their periphery with each other. Subsequently, one or several connecting parts for evacuating the sealed-in volume are inserted, whereby said parts pierce through the top or bottom film.

The top and bottom films have in each of the methods a) to c) a lateral protrusion on all sides extending over the layer sequence. If the layer sequence consists of layers of individually varying dimensions, the top and bottom films protrude over those layers having the largest individual dimensions. The sizes of the lateral protrusions of top and bottom film are selected in such a manner that the protrusions may be connected along their periphery with each other during further processing. The lateral protrusions of the top and bottom film may be cut back (excepting said necessary protrusion) around the contour of the widest layer. The contour of the cutting edge may here follow the measurement of the stack made from top and bottom film and layer sequence, or it may follow the contour of the widest layer, or show a different shape. The top and bottom films are preferably connected by sealing (welding), glueing, forming, flanging or turning over.

Methods for Evacuating the Volume and for an Almost Completely Gas-Tight Sealing Between Top and Bottom Film During Production of a Flat and Even Layered Semi-Finished Product Having Optional Metallic Inserts The following methods for evacuating the semi-finished and for an almost completely gas-tight sealing between top and bottom film are preferred:
a) In a preferred method, the even stack consisting of top and bottom film and the layer sequence between them which may contain metallic inserts, are placed together in an hermetically sealed room, which is then evacuated. Alternatively, the semi-finished may also be fed into an already evacuated room. The evacuation degree of the stack may be set individually by means of the evacuation degree of the room, whereby a room that has been evacuated as completely as possible is particularly preferred. This method is suitable for all stacks prepared according to methods a), b) and c). In this case the stack may be compressed by a suitable tool whereby advantageously the air is also squeezed out of the stack. The connection of the protruding edges of top and bottom film then takes place preferably within the evacuated room to avoid gas flowing again into the layer structure. Only after completely connecting top and bottom film and gas-tight sealing in of the volume situated between them, the tool is released and the semi-finished taken out of the hermetically sealed room or discharged, or else pressure in the room is brought back to ambient pressure.

If the connection of the protruding edges of top and bottom film takes place without using a tool to compress the stack, the stack is only compressed after aerating the hermetically sealed room by the air pressure, and thus the stack height is reduced.

b) In a further preferred embodiment, which is especially suitable for stacks prepared according to method b), the sealed-in volume is subsequently evacuated through the at least one open access point, or through the connecting part. To prevent gases from flowing again into the evacuated volume, the top and bottom films are then completely connected with each other and the enclosed vacuum sealed in almost completely gas-tight. Similar methods are known from vacuum sealing of foods. In case that the at least one open access point is provided with a connecting part to which the evacuation device (pumping device) has been connected, the connecting part may be closed after evacuation. This may be carried out either irreversibly, for example by glueing or fusing the connecting part, or reversibly, by providing the connecting part with a shut-off valve, plug or locking clip/clamp. A reversible closure means that the sealed-in volume of the semi-finished may be very easily aerated or filled with another fluid (gas and/or liquid). The connecting part is preferably made from the same material as the top and bottom films and may therefore be closed just like those, resulting in a homogeneous semi-finished product.

c) In a further preferred embodiment, which is especially suitable for stacks prepared according to method c), for evacuation, at least one pumping device is introduced into the volume sealed in almost completely between top and bottom film, this device preferably being an evacuation cover whereby top and bottom film are penetrated. By means of this pumping device, a partial vacuum is created and the volume evacuated. Subsequently the access points of the pumping device(s) are closed again almost completely gas-tightly. This may be carried out for example by sealing top and bottom films together, by sealing the films with one another, or by applying an additional piece of film.

Preferably special pieces of film, for example having indentations of the protruding edges, are intended for introducing the pumping devices.

Air expulsion from the stack made up of the top and bottom film and of the layer sequence in between with optional metallic inserts takes place preferably mechanically. Here the air is ejected using a punch, pad or cushion, or another mechanical device moving towards the protruding edges of the top and bottom films. Particularly preferably, the stack is heated up to a temperature which lies below the melting/reaction temperature of the matrix material. Thus the air contained in the stack expands and may be ejected more easily. Connecting the protruding edges of top and bottom film also preferably takes place at this raised temperature. If the volume between the top and bottom films is sealed in almost completely gas-tight, the stack is cooled down which reduces the pressure within the semi-finished product.

In all the variants of the method according to the invention according to A. optionally during the evacuation process of the volume present between the top and bottom films a device for keeping the layer structure down (such as a pressure pad) may be pressed onto these films and the layers between them.

Particularly preferably, a mechanical air expulsion from the enclosed volume is combined with evacuation using a pumping device.

Depending on the material of the top and bottom films, protruding material of these films is cropped, both after connecting them and before placing them in the discontinuous method of layering, using scissors, cutters, laser cutting devices, heat, or punching. Cutting off the protruding edges after connecting the top and bottom layers is preferably carried out close to the connection line of both films. In a particularly preferred method, cropping the protrusions of thermoplastic top and bottom films takes place in a tool simultaneously with sealing them.

B. Method for Producing a Pre-Formed Layered Semi-Finished Product

The following four partial steps are to be carried out:
Introducing the layer sequence between top and bottom film
Adjusting the layer sequence between top and bottom film to the mould, curved in one or more places, that is to give the semi-finish its intended shape.
Evacuating the volume between top and bottom film
almost completely gas-tight inclusion of the volume between top and bottom film Methods for introducing and adjusting the layer sequence between top and bottom film into the mould:

a) In a first preferred method, a thermoplastic bottom film is placed into the mould and adjusted to it. Afterwards, the single or pre-connected layers of the layered structure or the complete prepared layered structure are placed into the mould and adjusted to it. Then the thermoplastic top film is placed into the mould and adjusted to it. If pre-connected layers are used, these are preferably tacked together with thread or yarn (which may also contain matrix material), so that they may still shift a little against one another, but cannot completely be detached from one another or shift too much either.

b) In a second preferred embodiment, thermoplastic films are cut to size to cover a layer sequence with lateral protrusions on every side as top and bottom films. Subsequently, the top and bottom films and the layer sequence are placed together into the mould and adjusted to it.

c) In a third preferred embodiment it is intended that the layer sequence is arranged between two thermoplastic films so that these cover the layer sequence, protruding over it laterally on all sides as top and bottom films. Subsequently, top and bottom film are partly connected with each other. However, one or two access points to the enclosed volume remain. Afterwards, the top and bottom films with the enclosed layer sequence are placed into the mould and adjusted to it. In a preferred modification of this method it is intended that the remaining access point, or points, are provided with connecting parts to connect the pumping device for evacuation the volume between top and bottom film. To this end, preferably one connecting part (for example a tube) is introduced between top and bottom film, and the films are then connected with each other up to the connecting part, and there connected with the connecting part. Thus the connecting part forms the access point for evacuation.

d) In a fourth preferred embodiment it is intended that the layer sequence is arranged between two thermoplastic films so that these cover the layer sequence, protruding over it laterally on all sides as top and bottom films. Subsequently, top and bottom film are completely connected along their periphery with each other. Subsequently, one or several connecting parts for evacuating the sealed-in volume are inserted, whereby said parts pierce through the top or bottom film. Afterwards the top and bottom films with the sealed-in layer sequence are placed in the mould and adjusted to it.

The top and bottom films have in each of the methods a) to d) a lateral protrusion on all sides extending over the layer sequence. If the layer sequence consists of layers of individually varying dimensions, the top and bottom films protrude over those layers having the largest individual dimensions. The sizes of the lateral protrusions of top and bottom film are selected in such a manner that the protrusions may be connected along their periphery with each other during further processing. The lateral protrusions of the top and bottom film may be cut back (excepting said necessary protrusion) around the contour of the widest layer. The contour of the cutting edge may here follow the measurement of the stack made from top and bottom film and layer sequence, or it may follow the contour of the widest layer, or show a different shape. The top and bottom films are preferably connected by sealing (welding), glueing, forming, flanging or turning over.

The adjustment to the mould takes place preferably by using a matching piece of complementary shape, having due regard to the stack thickness, as pressure pad for compressing the stack into the mould. If the complexity of the mould (with one or several bends or curves) is low, preferably a forming pad or inflatable bellows is used to compress the stack into the mould. Further methods known from prior art for introducing soft flat bodies into moulds are in principle also suitable for introducing the stack into the mould.

Methods for Evacuating the Volume and for an Almost Completely Gas-Tight Sealing Between Top and Bottom Film in the Production of a Pre-Formed Layered Semi-Finished Product After placing the stack consisting of top and bottom film and the layer sequence in between into the mould, the volume between the top and bottom films is evacuated and sealed almost completely gas-tight.

a) In a preferred method, the stack consisting of top and bottom film and the layer sequence between them are placed together with the mould in an hermetically sealed room, which is then evacuated. The degree of evacuation of the stack may be set individually via the degree of evacuation of the room, whereby a completely evacuated room is preferred. This method is suitable especially for stacks introduced into moulds according to methods a), b) and c). In this case the stack may be compressed by a suitable tool the shape of which corresponds exactly to that of the mould, having due regard to the stack thickness. The connection of the protruding edges of top and bottom film then takes place preferably within the evacuated room to avoid gas flowing again into the layer structure. Only after completely connecting top and bottom film and gas-tight sealing in of the volume situated between them, the suitably shaped tool is released and the semi-finished taken out of the hermetically sealed room and discharged from the mould, or else pressure in the room is brought back to ambient pressure.

If the connection of the protruding edges of top and bottom film takes place without using a tool to compress the stack, the stack is only compressed after aerating the hermetically sealed room by the air pressure, and thus the stack height is reduced.

b) In a further preferred embodiment, which is especially suitable for stacks placed into the mould according to method c), the sealed-in volume is subsequently evacuated through the at least one open access point. To prevent gases from flowing again into the evacuated volume, the top and bottom films are then completely connected with each other and the enclosed vacuum sealed in almost completely gas-tight. Similar methods are known from vacuum sealing of foods. In case that the at least one open access point is provided with a connecting part to which the evacuation device (pumping device) has been connected, the connecting part may be closed after evacuation. This may be carried out either irreversibly, for example by glueing or fusing the connecting part, or reversibly, by providing the connecting part with a shut-off valve, plug or locking clip/clamp. A reversible closure means that the sealed-in volume of the semi-finished may be very easily aerated or filled with another fluid (gas and/or liquid). The connecting part is preferably made from the same material as the top and bottom films and may therefore be closed just like those, resulting in a homogeneous semi-finished product.

c) In a further preferred embodiment, which is especially suitable for stacks placed into the mould according to method d), for evacuation, at least one pumping device is introduced into the volume sealed in almost completely between top and bottom film, this device preferably being an evacuation cover, whereby top and bottom film are penetrated. By means of this pumping device, a partial vacuum is created and the volume evacuated. Subsequently the access points of the pumping device(s) are closed again almost completely gas-tightly. This may be carried out for example by sealing top and bottom films together, by sealing the films with one another, or by applying an additional piece of film.

Preferably special pieces of film, for example having indentations of the protruding edges, are intended for introducing the pumping devices.

Air expulsion from the stack made up of the top and bottom film and of the layer sequence in between takes place preferably mechanically. Here the air is ejected using a punch, pad, or another mechanical device moving towards the protruding edges of the top and bottom films. Particularly preferably, the stack is heated up to a temperature which lies below the melting/reaction temperature of the matrix material. Thus the air contained in the stack expands and may be ejected more easily. Connecting the protruding edges of top and bottom film also preferably takes place at this raised temperature. If the volume between the top and bottom films is sealed in almost completely gas-tight, the stack is cooled down which reduces the pressure within the semi-finished product.

In all the variants of the method according to the invention optionally during the evacuation process of the volume present between the top and bottom films a device for keeping the layer structure down (such as a pressure pad) may be pressed onto these films and the layers between them.

Particularly preferably, a mechanical air expulsion from the enclosed volume is combined with evacuation using a pumping device.

Depending on the material of the top and bottom films, protruding material of these films is cropped, both after connecting them and before placing them in the discontinuous method of layering, using scissors, cutters, laser cutting devices, heat, or punching. Cutting off the protruding edges after connecting the top and bottom layers is preferably carried out close to the connection line of both films. In a particularly preferred method, cropping the protrusions of thermoplastic top and bottom films takes place in a tool simultaneously with sealing them.

DETAILED DESCRIPTION OF THE PREFERRED EMBODIMENTS

Exemplary Embodiment

A. Exemplary Embodiment for a Flat and Even Layered Semi-Finished Product

Figure 1:
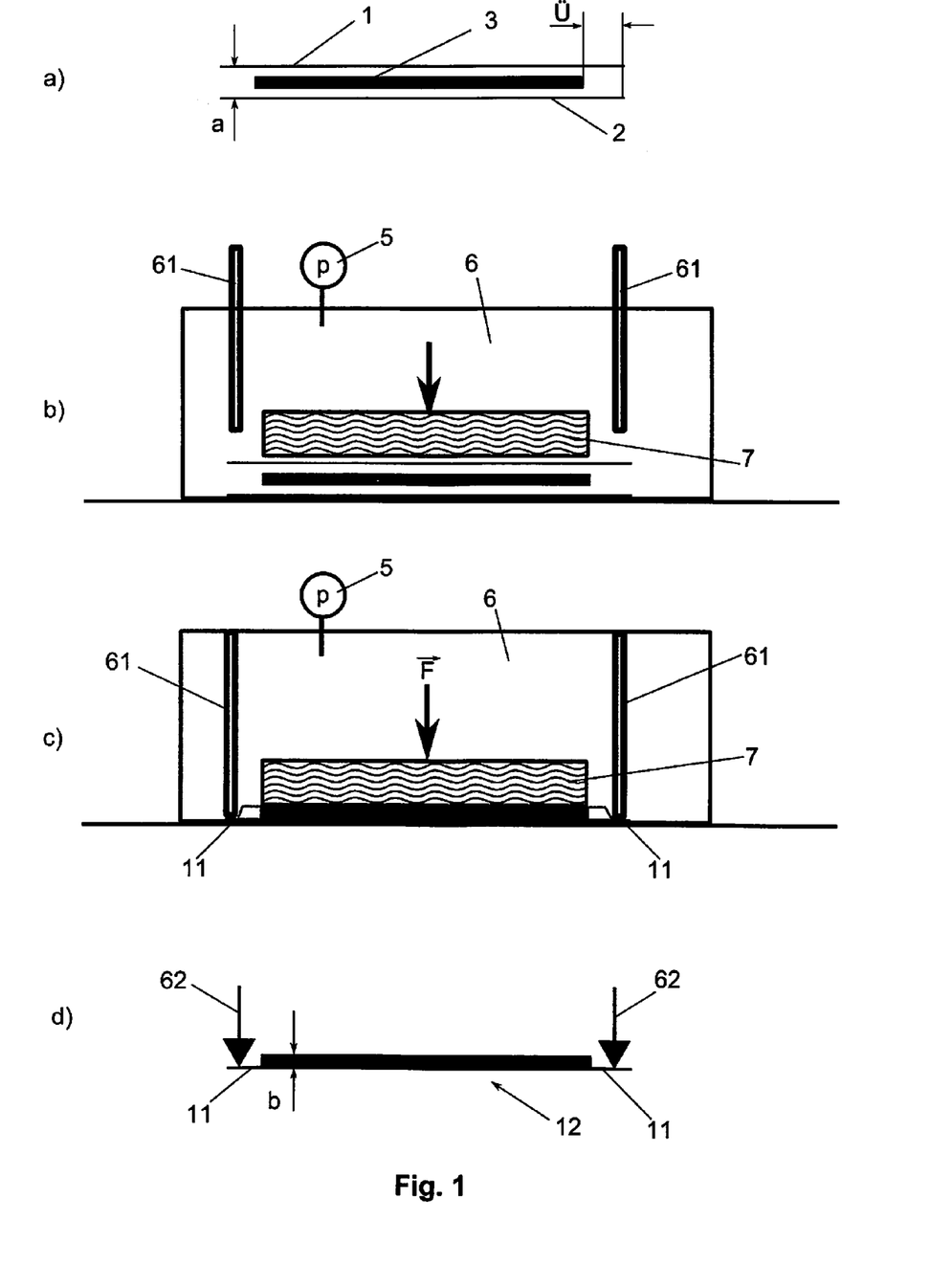
FIG. 1 shows the method according to the invention in variant b) of the method of introducing the layer sequence between top and bottom film, as well as variant a) for evacuation of the volume and for its almost completely gas-tight inclusion between top and bottom film.

FIG. 1 shows the method according to the invention in variant b) of the method of introducing the layer sequence between top and bottom film, as well as variant a) for evacuation of the volume and for its almost completely gas-tight inclusion between top and bottom film.

Top and bottom films are films made from matrix material (PA6, i.e. polyamide films having a material thickness of 0.1, and measuring 600 mm×600 mm). For the structure of the layer sequence between top and bottom film six film layers are intended, between which five layers of fabric of reinforcing fibres are arranged in an alternating layer sequence. As material of reinforcing fibres layers of carbon fibre fabric are used. The carbon fibre fabric has a surface weight of 285 g/m$^2$, and measures of 570 mm×570 mm. The film layers also consist of PA6 film (0.1 mm thick; measuring 570 mm×570 mm). The stack therefore has on its top and bottom side two PA6 films lying one over the other, between which layers of fabric of reinforcing fibres and films are arranged in an alternating manner. The fibre volume content is calculated to be approx. 50 percent.

In step a) the bottom film (1), the layers of the layer sequence (3), and the top film (2) are laid one on another in sequence. The bottom film (1) and the top film (2) have a protrusion (Ü) on all sides of 1.5 mm over the edge of the layer sequence (3). The height (a) of the stack results from the uncompressed layer sequence and the thickness of the films, and is approx. 2.2 mm.

In the next step of the method (b) the stack is placed in the vacuum chamber (6).

In the following step c) the stack is compressed using the tool (7) so that the stack contains no or very little air. Simultaneously the vacuum chamber (6) is evacuated via the pumping device (5). Subsequently the protruding edges (Ü) are sealed together using the tool (61).

After aerating the vacuum chamber (6) and opening the tool (7) the completed semi-finished product (12) is taken out (process step d)). Within the volume enclosed by top (2) and bottom film (1) the pressure is much lower than ambient pressure, and therefore the individual layers of the stack are pressed onto each other. Thus they can hardly shift. Now the remainder of the protruding edge outside the peripheral sealing seam is cropped using the tool (62). The semi-finished thus preformed is suitable for storage.

Figure 2:
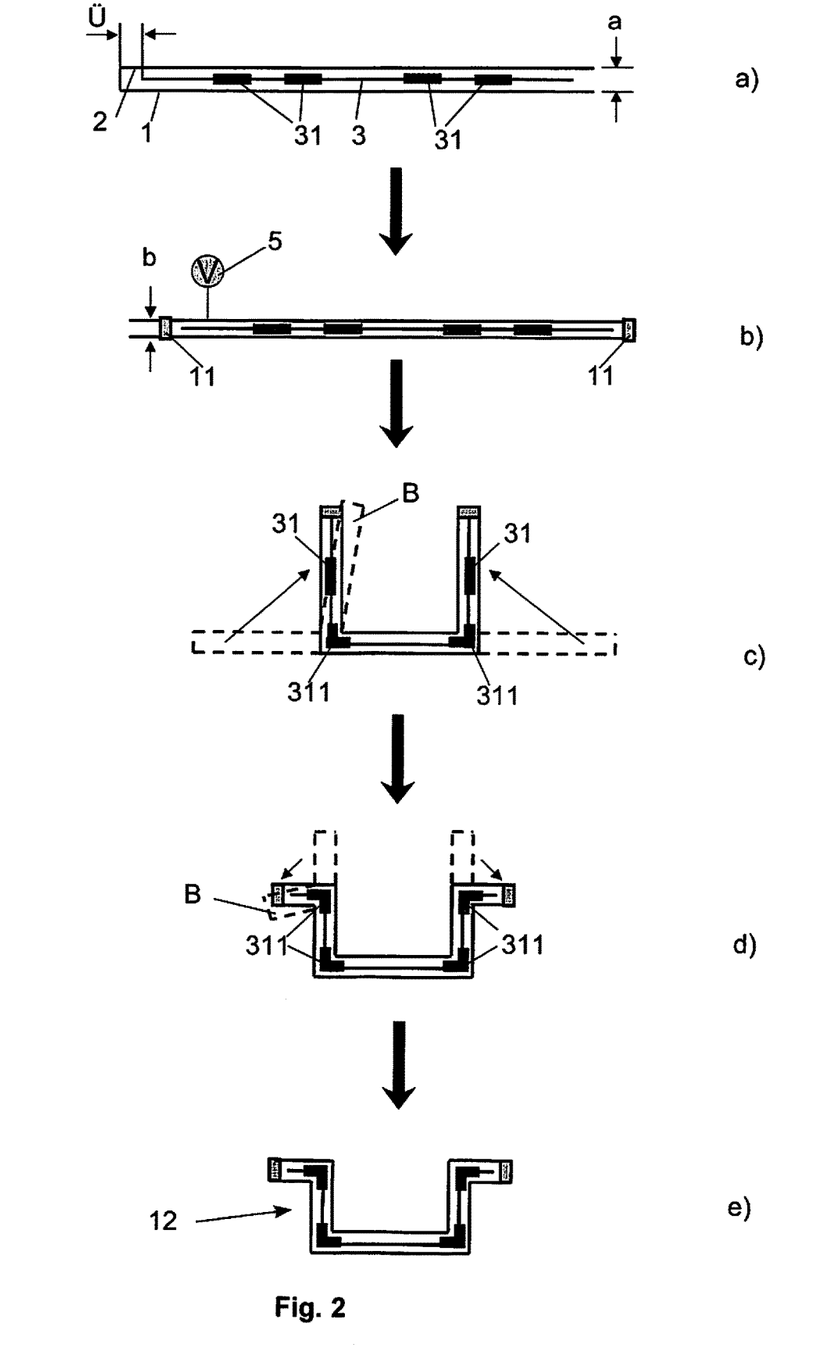
FIG. 2 shows the method according to the invention in the embodiment having metallic inserts.

FIG. 2 shows the method according to the invention in the embodiment having metallic inserts. In step a) the stack made from bottom film (1), top film (2) and the layer sequence (3) present in between is built by putting the individual layers on one another. The top (2) and bottom film (1) consist of polyacrylic PA6 film (0.1 mm thick; with the dimensions 600 mm×600 mm. The layer stack (3) has five layers of carbon fibre fabric (fabric of reinforcing fibres) with a surface weight of 285 g/m$^2$, seven layers of PA6 film (0.1 mm thick) and a layer containing four strips of steel (31) and having the dimensions 570 mm×100 mm×0.25 mm. In the layer sequence, one layer of film alternates with one layer of carbon fibre fabric. In the centre of the layer sequence, instead of the layer of carbon fibre fabric, the four strips of steel are inserted between two layers of film. The layers of carbon fibre fabric and the layers of film of the layer sequence each have dimensions of 570 mm×570 mm. The top (2) and bottom film (1) each has a protrusion (Ü). The height (a) of the stack is approx. 2.2 mm.

Step b) shows schematically how the protrusions (Ü) of the top (2) and bottom film (1) are sealed along their whole periphery and how subsequently the sealed-in volume between top (2) and bottom film (1) is evacuated using pumping device (5). Due to the surrounding air pressure the layer stack is compressed to height (b) of 1.8 mm. After removing the pumping device (5) the aperture to which it was attached, is closed. The flat semi-finished product is completed after step b). The semi-finished may now be stored and transported to a processing site.

Steps c) and d) illustrate options for further processing.

Step c) shows how to bend the semi-finished product in such a manner that the curvature is created in the metallic inserts (311). It is shown schematically how by overbending (B) the springback effect of the metallic inserts is compensated.

In step d) the remaining metallic inserts (311) are also bent, again using overbending (B).

Step e) shows the semi-finished product already adjusted to the geometry of the tool for consolidating.

B. Exemplary Embodiment for a Preformed Layered Semi-Finished Product

Figure 3:
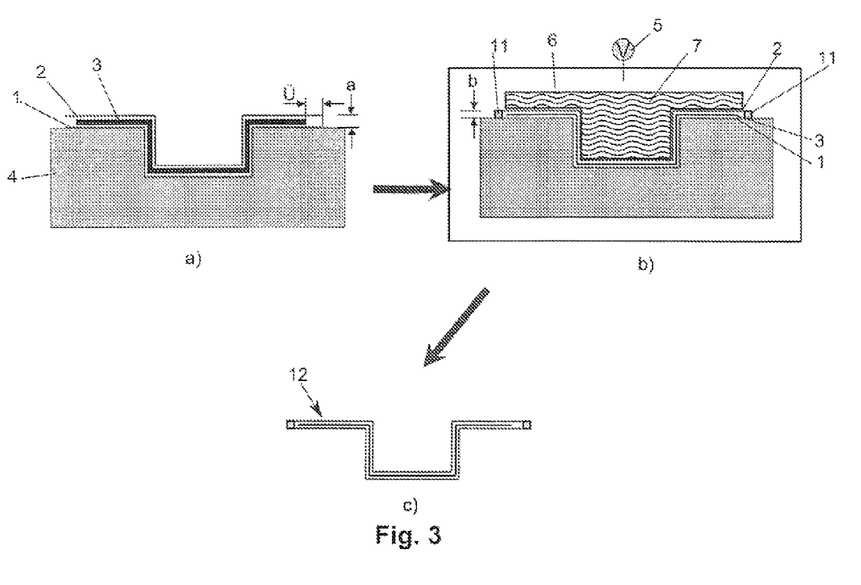
FIG. 3 shows the method according to the invention in variant b) of the method of introducing and adjusting the layer sequence between top and bottom film into the mould and variant a) for evacuating the volume and almost an completely gas-tight sealing between top and bottom film.

FIG. 3 shows the method according to the invention in variant b) of the method of introducing and adjusting the layer sequence between top and bottom film into the mould and variant a) for evacuating the volume and almost an completely gas-tight sealing between top and bottom film.

Top and bottom films are films made from matrix material (PA6, i.e. polyamide films having a material thickness of 0.1, and measuring 600 mm×600 mm). For the structure of the layer sequence between top and bottom film six film layers are intended, between which five layers of fabric of reinforcing fibres are arranged in an alternating layer sequence. As material of reinforcing fibres layers of carbon fibre fabric are used. The carbon fibre fabric has a surface weight of 285 g/m$^2$, and measures of 570 mm×570 mm. The film layers also consist of PA6 film (0.1 mm thick; measuring 570 mm×570 mm). The stack therefore has on its top and bottom side two PA6 films lying one over the other, between which layers of fabric of reinforcing fibres and films are arranged in an alternating manner. The fibre volume content is calculated to be approx. 50 percent.

In step a) the bottom film (1), the layers of the layer sequence (3), and the top film (2) are placed into the mould (4) in sequence. The bottom and top films have a protrusion (Ü) on all sides of 1.5 mm over the edge of the layer sequence (3). The height (a) of the stack results from the uncompressed layer sequence and the thickness of the films, and is approx. 2.2 mm. The depth of the cavity in the mould (4) is superelevated in FIG. 1 for illustration purposes. Its actual depth is 18 mm, and it is circular, having a diameter of 240 mm.

In the next process step (b) the mould (4) with the stack is positioned in the vacuum chamber (6). The stack is compressed using the tool (7) so that the stack contains no or very little air. The height (b) of the stack is now approx. 1.8 mm, and thus markedly lower than the height (a) of the uncompressed stack. Now the vacuum chamber (6) is evacuated via the pumping device (5). Subsequently the protruding edges (Ü) are sealed together.

After aerating the vacuum chamber (6) and opening the tool (7) the completed semi-finished product (12) is taken out (process step c)). Within the volume enclosed by top (2) and bottom film (1) the pressure is much lower than ambient pressure, and therefore the individual layers of the stack are pressed onto each other. Thus they can hardly shift, which means that the topology imprinted on them using the mould (4) is retained. The semi-finished thus preformed is suitable for storage.

LIST OF REFERENCE NUMERALS

1 Bottom film
2 Top film
3 Layer sequence
31 metallic inserts
311 Formed (bent) metallic inserts
4 Mould
5 Pumping device for evacuation
6 Hermetically sealed room
7 Tool
11 Peripheral sealing seam for connecting top and bottom film
12 Completed semi-finished product
Ü Lateral protrusion of the edges of top and bottom film extending over the layer sequence
a Height of the uncompressed stack
b Height of the compressed stack
B Overbending to compensate springback of the metallic inserts

The invention claimed is:

1. Method for producing a layered semi-finished product for further processing into fibre-reinforced composite components in a consolidating tool, the layered semi-finished product comprising a layer sequence having at least one layer of an unconsolidated fabric of reinforcing fibres and at least one layer having one or more metallic inserts, wherein the layer sequence is arranged, at reduced pressure, between a top film and a bottom film both films made from thermoplastic matrix material, said films are connected to each other along their periphery in a pressure-retaining manner, and wherein the layered semi-finished product is bent in one or more places according to a tool shape of the consolidating tool, wherein at least one of at least one resulting bend runs through at least one of the metallic inserts, the method comprising the steps:
  a. arranging the layer sequence between the top film and the bottom film made from thermoplastic matrix material,
  b. subsequently to step a., connecting protruding edges of the top film and the bottom film made from thermoplastic matrix material with one another,
  c. evacuating a volume between the top film and the bottom film made from thermoplastic matrix material, and
  d. deforming the semi-finished product such that a once or multiple times bent form of the semi-finished product according to the tool shape of the consolidating tool is generated, wherein at least one of at least one resulting bend runs through at least one of the metallic inserts, wherein steps b. and c. are carried out before step d. in any desired sequence, simultaneously or overlapping in time.

2. Method for producing a layered semi-finished product according to claim 1, characterized in that the layer sequence is built by making available at least one layer of an unconsolidated fabric of reinforcing fibres with at least one pocket- or tube-shaped recess or slit whereby at least one metallic insert is introduced in the at least one pocket- or tube-shaped recess or slit.

3. Method for producing a layered semi-finished product according to claim 1, characterized in that the layer sequence is built by laying at least one layer of an unconsolidated fabric of reinforcing fibres and at least one layer having metallic inserts onto each other flat and matching.

4. Method for producing a layered semi-finished product according to claim 1, characterized in that, in step a., the top film and the bottom film are cut to size, the layer sequence is arranged between these, and the top film and the bottom film are cropped, with a protrusion, around a contour of a largest layer of the layer sequence present between the top film and the bottom film.

5. Method for producing a layered semi-finished product according to claim 1, characterized in that the top film and the bottom film are completely connected with one another along the protruding edges, and subsequently, in order to evacuate the volume between the top film and the bottom film, the bottom film and/or the top film are pierced, thus creating at least one aperture to introduce a pumping device, using which the volume is evacuated, with the at least one aperture being resealed again after evacuation in a pressure-retaining manner.

6. Method for producing a layered semi-finished product according to claim 1, characterized in that evacuation of the volume between the top film and the bottom film is carried out by placing the top film and the bottom film and the layer sequence between them in an hermetically sealed room which is then evacuated, and wherein afterwards the protruding edges of the top film and the bottom film are completely connected along their periphery with each other.

7. Method for producing a layered semi-finished product according to claim 1, characterized in that evacuation of the volume between the top film and the bottom film is carried out by heating the top film and the bottom film and the layer sequence present between them to a temperature below melting temperature or reaction temperature of the matrix material, and air contained within is expelled from inside to outside using a mechanical device.

8. Method for producing a layered semi-finished product according to claim 1, characterized in that, when connecting the top film and the bottom film, at least one aperture for a pumping device remains open, through which the volume present between the top film and the bottom film is evacuated and which subsequently is re-sealed by completely connecting the top film and the bottom film in an almost completely gas-tight manner.

9. Method for producing a layered semi-finished product according to claim 1, characterized in that, during evacuation the volume between the top film and the bottom film, additionally a blank holder is pressed onto the top film and the bottom film and the layer sequence present in between.

10. Method for producing a layered semi-finished product according to claim 1, characterized in that connecting the top film and the bottom film is carried out by sealing, glueing, turning over or flanging.

11. Method for producing a layered semi-finished product according to claim 1, characterized in that protruding material from the top film and the bottom film is cropped using scissors, cutters, pulsed cutters, laser cutting devices, heat or punching near the sealing seams.

12. Method for producing a layered semi-finished product for further processing into fibre-reinforced composite components in a consolidating tool, the layered semi-finished product comprising a layer sequence having at least one layer of an unconsolidated fabric of reinforcing fibres and at least one layer having one or more metallic inserts, wherein the layer sequence is arranged, at reduced pressure, between a top film and a bottom film both films made from thermoplastic matrix material, which films are connected to each other along their periphery in a pressure-retaining manner, and wherein the layered semi-finished product is bent in one or more places according to a tool shape of the consolidating tool, wherein at least one of at least one resulting bend runs through at least one of the metallic inserts, the method comprising the steps
- a. arranging the layer sequence between the top film and the bottom film made from thermoplastic matrix material,
- b. subsequently to step a., positioning the layer sequence and the top film and the bottom film in a mould corresponding to the tool shape of the consolidating tool and having one or several curves or bends, wherein the layer sequence is positioned such that at least one of the metallic inserts is bent,
- c. connecting protruding edges of the top film and the bottom film made from thermoplastic matrix material with one another, and
- d. evacuating a volume between the top film and the bottom film made from thermoplastic matrix material, wherein steps b., c. and d. are carried out in any of the sequences b., c., d. or b., d., c. or c., d., b. or d., c., b.

* * * * *